United States Patent
Ernstrom et al.

(10) Patent No.: US 6,898,273 B2
(45) Date of Patent: May 24, 2005

(54) METHOD FOR LOCAL EXCHANGE SUBSCRIBER LINE CONFERENCING

(75) Inventors: William Paul Ernstrom, Golden, CO (US); Thomas Edward Yackey, Broomfield, CO (US); Warren Edward Baxley, Westminster, CO (US)

(73) Assignee: Polycom, Inc., Pleasanton, CA (US)

( * ) Notice: Subject to any disclaimer, the term of this patent is extended or adjusted under 35 U.S.C. 154(b) by 73 days.

(21) Appl. No.: 10/208,893

(22) Filed: Jul. 30, 2002

(65) Prior Publication Data

US 2003/0026406 A1 Feb. 6, 2003

Related U.S. Application Data

(60) Provisional application No. 60/309,419, filed on Aug. 1, 2001.

(51) Int. Cl.$^7$ ................................................. H04M 3/42
(52) U.S. Cl. .............................. 379/202.01; 379/207.01
(58) Field of Search ..................... 379/207.02, 202.01, 379/207.01, 220, 219, 201.01

(56) References Cited

U.S. PATENT DOCUMENTS

| | | | |
|---|---|---|---|
| 5,483,588 A | * | 1/1996 | Eaton et al. ............ 379/202.01 |
| 5,812,652 A | | 9/1998 | Jodoin et al. |
| 5,974,133 A | | 10/1999 | Fleischer, III et al. |
| 5,995,608 A | | 11/1999 | Detampel, Jr. et al. |
| 6,178,237 B1 | | 1/2001 | Horn |
| 6,181,786 B1 | | 1/2001 | Detampel, Jr. et al. |
| 6,269,159 B1 | | 7/2001 | Cannon et al. |
| 6,304,652 B1 | | 10/2001 | Wallenius |
| 6,418,214 B1 | * | 7/2002 | Smythe et al. .......... 379/202.01 |
| 6,463,038 B1 | * | 10/2002 | Wilson ....................... 370/261 |
| 2002/0091769 A1 | | 7/2002 | Drozdzewicz et al. |
| 2002/0165963 A1 | | 11/2002 | Baxley et al. |

OTHER PUBLICATIONS

U.S. Appl. No. 09/426,684, filed Oct. 25, 1999, Baxley et al.
U.S. Appl. No. 10/238,121, filed Sep. 10, 2002, Adams et al.
The freedom to communicate, http://www.voyanttech.com/solutions/rv/how_it_works.php, circa 1999.

* cited by examiner

Primary Examiner—William J. Deane, Jr.
(74) Attorney, Agent, or Firm—Wong, Cabello, Lutsch, Rutherford & Brucculeri, LLP

(57) ABSTRACT

A local conferencing exchange subscriber line conferencing system and method using a series of input signals from the phone of a subscriber, such as a dual-tone multifrequency (DTMF) sequence of key inputs starting with a star key input, to initiate the conference. The conference is set up in a bridge and the phone of the subscriber is connected to the bridge. All subsequent callers to the subscriber's phone number at the local exchange carrier are routed and connected to the conference at the bridge. When the conference call ends, the subscriber's phone is returned to normal service.

42 Claims, 9 Drawing Sheets

METHOD FOR LOCAL EXCHANGE SUBSCRIBER LINE CONFERENCING

RELATED INVENTIONS

This application claims priority to provisional application Ser. No. 60/309,419 filed Aug. 1, 2001 entitled LOCAL EXCHANGE SUBSCRIBER LINE CONFERENCING.

This application is related to Ser. No. 10/208,503 filed contemporaneously herewith entitled METHOD FOR LOCAL EXCHANGE SUBSCRIBER LINE CONFERENCING and is herein incorporated by reference.

BACKGROUND OF THE INVENTION

1. Field of the Invention

The present invention pertains to call conferencing and, in particular, to reservation-less instant conferencing as it relates to business and residential local exchange telecommunication service subscribers.

2. Statement of the Problem

A need exists for Regional Bell Operating Companies (RBOCs), wireless carriers, and other Local Exchange Carriers (LECs) to provide simple conferencing services to residential and small office telephone service subscribers. Practicality of the conferencing service for local exchange subscriber line users is dependent upon extreme ease of use through simple, easy to remember access methods that utilize conferencing automation to the maximum practical extent.

U.S. Pat. No. 6,181,786 B1, owned by the assignee of the present invention, sets forth a method and apparatus for on-demand teleconferencing. This represents a prior call conferencing approach eliminating prior scheduling and operator interaction in setting up a conference call. This prior art approach uses, for example, the Signaling System No. 7 (SS7) out-of-band signaling to dynamically route incoming conference calls to bridges in a conferencing system having available resources. In operation, a subscriber to the conferencing service is given a telephone number for connecting to the conferencing system along with a system pass code and a maximum conference size at the time he or she signs up for the service. In order to have a conference, the subscriber distributes his or her access telephone number to the conference participants along with an access code and optional conference security (or PIN) code of the subscriber's choosing. The processing of the conference call, billing, etc. is handled at the conferencing system. This mechanism is considered overly complex for application to local exchange subscriber line users because of the need to remember these access telephone numbers, access codes, and PIN codes.

Current conferencing service available to local exchange subscriber line users includes three-way conferencing that is typically accessed through a hook-flash mechanism that provides the user with a second dial tone for use in connecting a third party to an existing two-party telephone call. A need exists to extend the capabilities of this type of service through significant simplification of access mechanism as well as through availability of greater than the three conventional call legs simultaneously involved in a conference call event.

SUMMARY OF INVENTION

The present invention solves the aforestated problem and meets the needs stated therein. The local exchange subscriber line conferencing of the present invention, from the perspective of the conferencing system, is characterized by reservation-less instant conferencing as it relates to business and residential telecommunication subscribers. From the perspective of the user, the service of the present invention is characterized by a simplified access method for conferencing services that takes advantage of telecommunication network capabilities to eliminate many of the current art complexities involved with accessing such service.

A local exchange subscriber line conferencing system and method is set forth herein. A series of input signals from the phone of a subscriber (such as a DTMF sequence of key inputs starting with a star key input) initiate the conference call in the LEC. The conference call is then set up in a bridge and the phone of the subscriber is connected to the bridge. All subsequent callers to the subscriber's phone number at the LEC are routed and connected to the conference call at the bridge. When the conference call ends, the subscriber's phone is returned to normal service so as to receive all incoming calls made to its phone number.

DETAILED DESCRIPTION OF THE INVENTION

1. Overview

The conferencing service of the present invention enables Regional Bell Operating Companies (RBOCs), Wireless Carriers, and other Local Exchange Carriers (LECs) to provide simple conferencing to residential and small office telephone service subscribers. The present invention, in one embodiment, uses the telephone "*" (star) key to initiate a conference call and like other star services, conferencing is activated by selecting "*" the key followed by a unique set of numbers. These are conventionally referred to as dual-tone multifrequency (DTMF) signals. Other access methods that do not use a "*" key code sequence for access represent additional embodiments of this present invention. Any predetermined series of key input signals from the phone of a subscriber can be used when the subscriber requests the conference call.

The subscriber informs the other parties (participants) to simply call the subscriber's phone number at the time of the conference. Subsequent parties to the conference call join either by dialing the published phone number of the subscriber or by dial-out from the conference. The LEC for the subscriber then routes all subsequent callers of the subscriber's phone number to the conference at a bridge where all such subsequent callers who are participants are connected to the conference.

At the end of the conference, the LEC returns the subscriber's phone to normal service so that any party then calling the subscriber's phone number is rung through to the subscriber's phone.

2. Operation a. System

Figure 1:
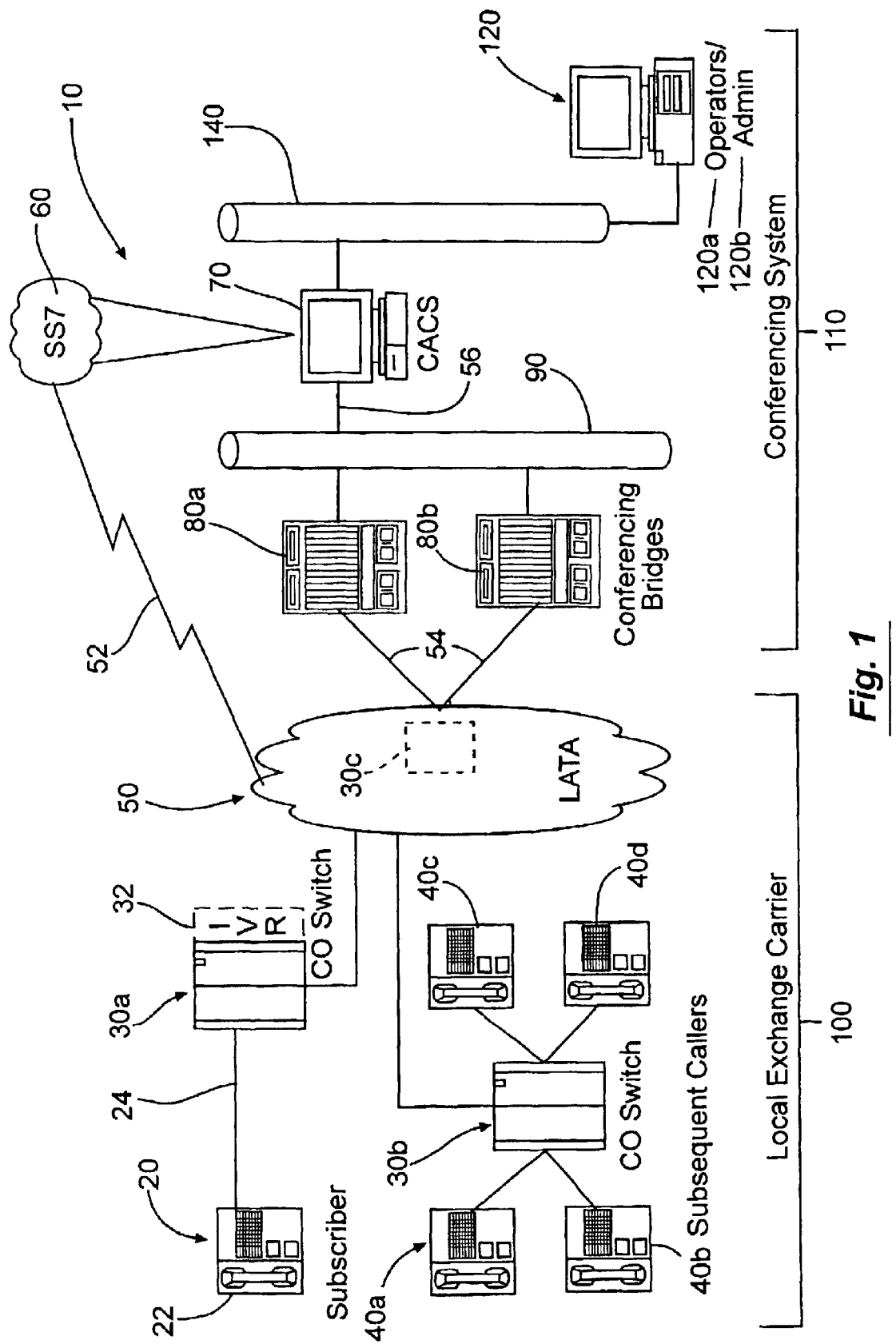
FIG. 1 sets forth one embodiment of the telecommunication network incorporating the conferencing service of the present invention.

In FIG. 1, the overview of the telecommunication network incorporating the conferencing service system 10 of the present invention is set forth. A subscriber 20 setting up the conference call is shown in communication with a central office (CO) or Mobile Switching Office (MSO) switch 30a. Likewise, subsequent callers 40a, 40b, 40c, and 40d to the conference call are shown at another CO or MSO switch 30b. In FIG. 1, the subsequent callers 40a–40d are illustrated having access to the same CO or MSO switch 30b. It is to be expressly understood that each subsequent caller 40 (such as 40a, 40b, 40c, 40d . . . ) could be accessing a different CO (or MSO) switch in the same LEC or in different parts of the country (or world) with different LECs, RBOCs, etc. It is also to be expressly understood that while the subscriber 20 is accessing the CO switch 30a through a calling phone set 22, that the present invention 10 is not limited to such an arrangement and the subscriber 20 could be accessing a mobile switching center through a wireless carrier by using a cell phone or the like.

The CO switches 30 (such as 30a, 30b, 30c, . . . ) are part of Local Access and Transport Areas 50 (LATAs) as defined based on the AT&T Bell System break up into 161 local telephone serving areas in the United States. LEC 100 has exclusive rights to operate within a LATA 50 subject to the state Public Utility Commission (PUC) regulations. In FIG. 1, LEC 100 and conference system 110 are in the LATA 50.

LATA 50 shown in FIG. 1 has two separate communication paths. The first path 52 is through the SS7 60 which communicates with a Conference Allocation and Control System (CACS) 70 in the conferencing system 110. An example of a commercially available CACS 70 is the READIVOICE system from Voyant Technologies, Inc. LATA 50 also communicates over path 54 with the conferencing bridges 80. The conferencing bridges 80 are connected to a Switched 10/100 Base T data network 90 which is also connected over path 56 to CACS 70. An example of a commercially available conferencing bridge 80 is the INNOVOX media server also from Voyant Technologies, Inc. The CACS 70 in turn is administered over a local area network 140 by an operator/administrator 120.

CACS 70 acts as the conferencing resource manager and contains information about subscribers and/or subscriber profiles and available bridge conferencing resources. In another embodiment the CACS 70 is within the LEC's network and is installed behind a switch or multiple switches 30. As shown in FIG. 1, 'dynamic' routing, using the SS7 network 60, of a conference to a bridge 80 occurs and represents one embodiment. The present invention also uses alternative embodiments such as carrier-supplied signaling methods other than the SS7 network 60 (for example TCP/IP communication mechanisms that serve the same purpose), and signaling mechanisms where the communication is with the conferencing bridge 80 rather than the CACS 70 (for example Integrated Services Digital Network Primary Rate Interface (ISDN PRI). The conferencing methods set forth herein can be adapted to operate in a number of different telecommunication environments.

b. Subscriber

The system 10 of the present invention centers on the function of the subscriber 20 which is detailed below.

The subscriber 20 has a retail relationship with the LEC 100 in LATA 50. The subscriber 20 receives local service from the LEC 100 and has selected to receive the conferencing service 10 of the present invention as an additional service such as is done for conventional "call forwarding" from the LEC 100. The subscriber 20 interfaces, in one embodiment, with the application through a Plain Old Telephone Service (POTS) local loop phone 22. How a subscriber "subscribes" for and "interfaces" with the conferencing service 10 of the present invention can occur in many conventional ways with the LEC 100.

After subscribing and whenever the subscriber desires to have a conference call, the subscriber 20 first informs the other participants to the conference (1) of the time for the conference and (2) to call the subscriber's listed phone number at that time.

The conference, at or just before the time of the conference, is initiated, in one embodiment, by the subscriber 20 lifting the handset of the phone 22 and then entering for example '*' (i.e., pushing the "star" key) followed by a unique set of digits, for example "90." Any unique predetermined series of signals from the phone 22 such as a series of key inputs can be used. The subscriber 20 is put into "conference mode" by the LEC 100. Conference mode means that the subscriber 20 is transferred into the conferencing bridge system 110 and any subsequent calls by the intended conference participants (i.e., subsequent callers 40) to the subscriber's phone number will be routed to the subscriber's conference on a selected bridge 80 assigned to the conference call where the subscriber's conference is located.

Optionally, prior to being routed to the selected conferencing bridge 80, subsequent callers 40 that call the subscriber's phone number receive an Interactive Voice Response (IVR) message from IVR 32 stating, for example: "The person that you have called is presently in a conference, please press 1 (or other input or sequence) to join the conference." If a subsequent caller is not an intended participant, then "1" would not be pressed. In one embodiment, if the subscriber has a voicemail account with LEC 100, the caller receives an additional IVR message stating: "please press 2 to leave a voicemail." Such subsequent callers who are not intended participants can leave a voice message.

It is to be expressly understood that in the aforesaid, local loop phone 22 is an example, but that any suitable phone, such as a telephone, a cell or wireless phone, or any other suitable communication device used by a subscriber in any communication system such as, but not limited to, LATA 50 and LEC 100. Furthermore, while the "star" key is the preferred key of use due to its conventionality in the telephone industry and understanding by the public, it is to be understood that the predetermined series of key input signals can be generated or activated by any other suitable function key, signal, voice, or code from the subscriber could be utilized under the teachings of the present invention. As another embodiment, a special key on a cell phone or an icon in a display window of a cell phone or a wireless computer with cell phone capabilities is activated to generate the signal series.

Routing of the calls to the conferencing bridges 80 is controlled by switch 30a and CACS 70. When the subscriber 20 enters the "star" key input followed by the predetermined set of digits to put his/her phone number in conference mode in one embodiment of the invention, the switch 30a is set to forward all calls made to the subscriber's phone number to the selected bridge 80 or, optionally, to an IVR resource 32 that will play the introduction message. The IVR resource 32 can be located in switch 30a or in a system connected to, but separate from switch 30a. If the call is routed to the IVR resource 32, it is then responsible for collecting the digits and forwarding the call to the selected conferencing bridge 80 if the subsequent caller enters a "1" or other service that the LEC 100 has programmed as additional options, the above example being voicemail.

The rights and functionality available to the subscriber 20 are configurable. The LEC 100 provides particular features to certain groups of customers. For example, the LEC 100 might want to provide "mute all" to business subscribers but not residential subscribers. Many such conference control features are specific features developed for this application of the present invention include, but are not limited to:

(a) Single Line Auto Termination with Keep-Alive Prompt
   After a configurable timer expires in switch 30a, single line conferences would play a message to the line offering the chance to stay in conference through a DTMF key response from phone 22. A response would reset the timer. No response would cause the call to be disconnected and the conference to end. This feature would handle the case of a subscriber 20 who leaves his/her phone off hook in conference.

(b) Boot Last-In Participant
   This is a DTMF sequence (or other suitable command sequence) that would allow the subscriber 20 to key-in and remove undesired participants 40 from the conference.

(c) Pre-Route Lock
   conventional conferencing systems, a conference lock occurs after a subsequent caller 40 has been routed to the selected bridge 80. A message is played informing the caller 40 that the conference he/she is attempting to join is locked, followed by a disconnect. In the present invention, the call is redirected to the switch 30a to subscriber-line provisioned "busy" behavior or an IVR system 32 that would play the subsequent caller 40 a message such as: "The person that you have called is in a conference, please press two to leave them a voicemail or try back later."

(d) Conference Security Code
   In conventional conferencing systems, a Conference Security Code (CSC) applies after the subscriber 20 has enabled his/her subscriber line for conferencing by entering the '*' code. A DTMF sequence (or other suitable command sequence) would allow the subscriber 20 to provide a Conference Security Code consisting of a sequence of digits. In the service of the present invention, when a subsequent caller 40 has been routed to the selected bridge 80, a message will be played requesting that the CSC be entered. Only if the subsequent caller 40 enters the correct CSC, will the caller be placed into the conference. This feature would prevent the entrance of unwanted callers to the conference calling the subscriber's phone number.

(e) Channel Mute
   This is a DTMF (or other suitable command input) sequence that allows the subscriber 20 or any participant 40 to mute their conference input in order to prevent introduction of undesired noise into the conference. A similar DTMF sequence returns the line to an un-muted state.

(f) Conference Count
   This is a DTMF (or other suitable command input) sequence that allows the subscriber 20 or any participant 40 to receive a voice message count of the number of conference participants.

(g) Subscriber Dial Out
   This is a DTMF (or other suitable command input) sequence that allows the subscriber 20 to access a dial out line from the selected bridge 80 to call a participant 40 and add him/her to the conference.

(h) Operator Request
   This is a DTMF (or other suitable command input) sequence that would allow the subscriber 20 or any participant 40 to request an attendant or operator 120 to join and assist the conference.

The above features are controlled via the conference control mechanisms found in traditional conferencing systems, such as detailed in aforementioned '786 patent.

c. Routing Flow

Figure 2:
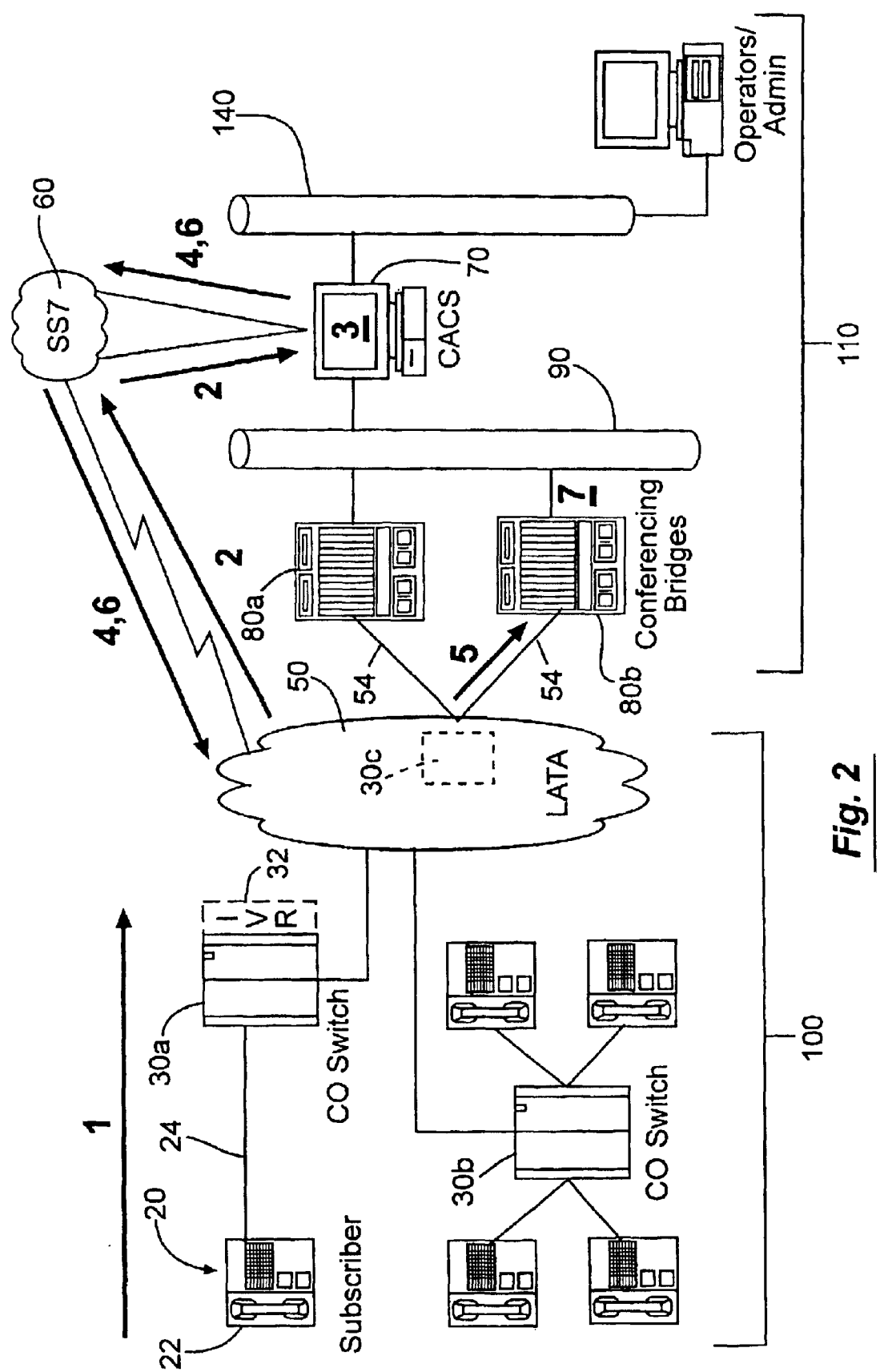
FIG. 2 is the network of FIG. 1 setting forth the method whereby a subscriber sets up a local exchange subscriber line conference call.

In FIG. 2, operation of the conferencing system 10 of the present invention in setting up a conference call is set forth.

(a) Subscriber *90 Inputting—

The following "numbers" identify the sequence flow of one embodiment which is illustrated by the arrows in FIG. 2. This is the method of the present invention by which a subscriber 22 initiates a conference call.

1. The subscriber 20 picks up phone 22 and dials *90 over line 24 to switch 30a in LEC 100.

2. The switch 30a responds by setting the subscriber's phone number to forward all subsequent calls to the conferencing system 100. In one embodiment a Private Hidden Forwarding Number (PHFN) is used which terminates in a selected bridge 80 such as bridge 80b. In a preferred embodiment, the switch 30a sends a Transactional Capabilities Application Part (TCAP) message through the SS7 network 60 to the CACS 70 including information about the subscriber's phone number (Calling Number) and the digits that the subscribers dialed (Called Number—*90 in this example). TCAP messages are conventional and are the application layer of the SS7 stack.

3. In one embodiment, the CACS 70 uses the Calling Number in the TCAP query to validate the subscriber and determine the conference profile. The conference profile may contain information about the conferencing features that are available as well as the maximum size of the conference. In another embodiment, the Calling Number in the TCAP query is used to validate the subscriber and the Called Number may be used to determine the conference profile. In another embodiment, the validation is performed at the switch 30a and either Calling Number or Called Number may be used to determine conference profile. The CACS 70 also determines which bridge 80 to select and place the conference based on available bridge resources. An example of one resource management approach is set forth in "Self-Tuning Statistical Resource Allocation for Multipoint Network Events", Ser. No. 09/812,971 filed Mar. 19, 2001 and assigned Voyant Technologies, Inc.

4. The CACS 70 responds through SS7 network 60 to the switch 30a with a TCAP message including call termination instructions indicating which bridge 80 to place the call.

5. The switch 30*a* then routes the subscriber 20 to the selected bridge 80 which in this example is bridge 80*b*.
6. The CACS 70 sends a TCAP message through the SS7 network 60 to switch 30*a* causing switch 30*a* to seek call termination instructions from CACS 70 any time a subsequent caller 30 dials the subscriber line's 24 phone number. The subscriber's line 24 is now enabled to become a conference call.
7. On the selected bridge 80*b*, the subscriber 20 is placed into conference conventionally as described in U.S. Pat. No. No. 6,181,786 B1, or by other conventional means of conference control.

The above method steps and message contents represent only an embodiment of the present invention and, it is to be understood that method steps order and message contents can vary based upon individual telecommunication architects without departing from the spirit of the present invention.

(b) Subsequent Caller Routing

Figure 3:
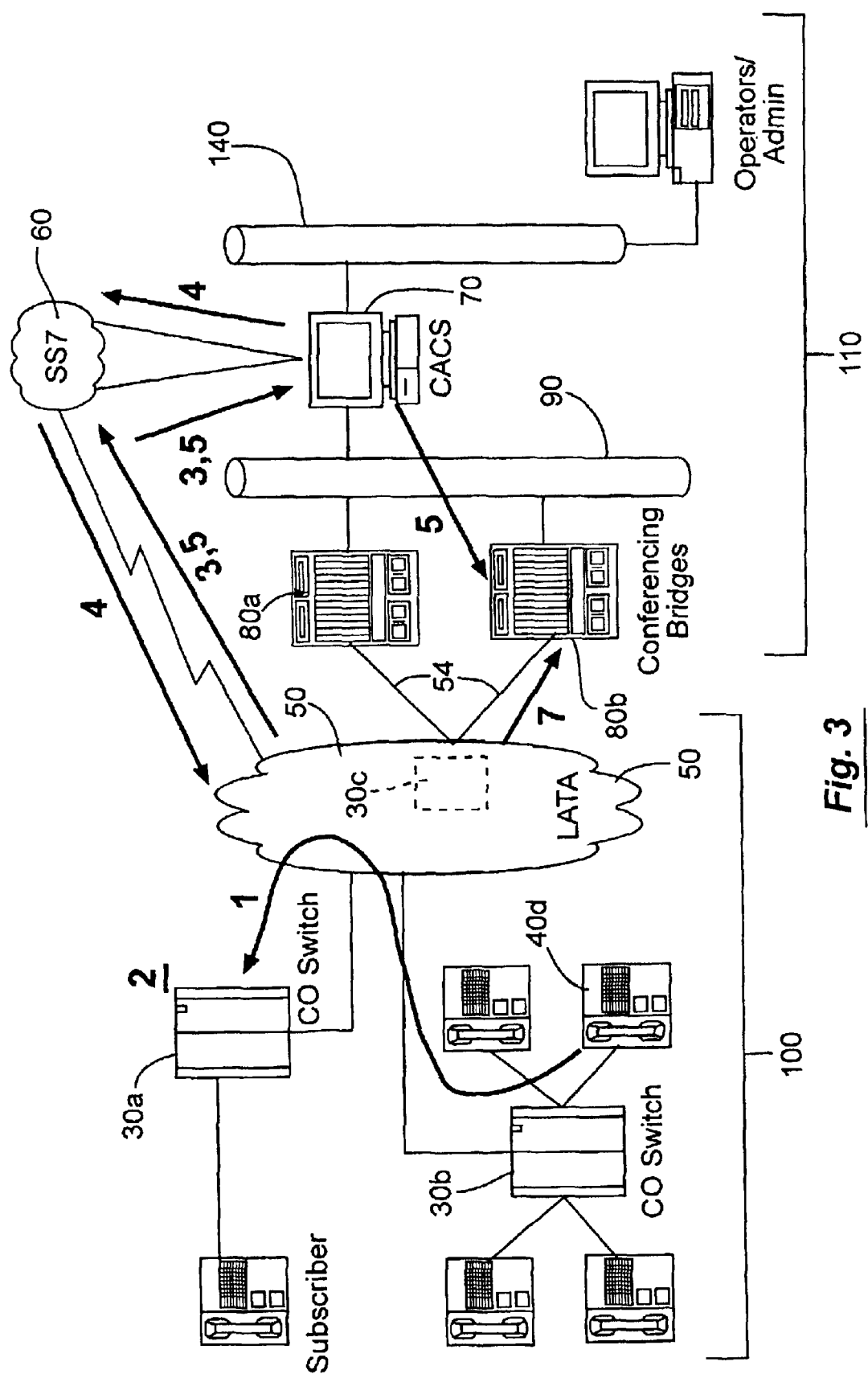
FIG. 3 is the network of FIG. 1 setting forth the method whereby a subsequent caller joins the subscriber's conference call.

In FIG. 3, operation of the conferencing system 10 of the present invention whereby a subsequent caller 40, such as caller 40*d*, joins the conference call is set forth for the SS7 network 60 embodiment. The numbers shown in FIG. 3 and below correspond to the method of accomplishing this routing:

1. A subsequent caller (e.g., 40*d*) dials the subscriber's phone number.
2. Switch 30*a* determines that the subscriber is in conference.
3. Switch 30*a* causes a routing request to be sent to the CACS 70 via SS7 network 60 to determine where to forward the call in the preferred embodiment of the SS7. In the PHFN embodiment (not shown), switch 30*a* forwards the subsequent caller to the subscriber's PHFN on the selected bridge 80*b*, the same bridge as the subscriber's conference call.
4. The CACS 70 through the SS7 network 60 requests that switch 30*a*, in one embodiment, play an announcement to the subsequent caller 40*c* requesting the subsequent caller 40*c* to "press 1 to enter the conference" (or other input or sequence) and to collect the digit(s) entered by the subsequent caller 40*c*.
5. Switch 30*a* sends the Caller Entered Digits (CED) (which would be "1" in this embodiment) from subsequent caller 40*c* through the SS7 network 60 to the CACS 70.
6. The CACS 70 validates the Caller Entered Digits (CED) input by the subsequent caller. If the CED is valid, the CACS 70 delivers through the SS7 network 60 to the CO switch 30*a* with a TCAP message including call termination instructions on the identity of the bridge 80*b* to place this subsequent caller. If the CED is not valid, the CACS 70 through the SS7 network 60 instructs switch 30*a* to disconnect the subsequent caller 40*d* or to route the subsequent caller to voicemail or other applicable call treatment (i.e. busy signal).
7. Switch 30*a* then connects the subsequent caller 40*d* to the selected bridge 80*b*.

On bridge 80*b*, the subsequent caller 40*d* is placed into conference conventionally as described in U.S. Pat. No. 6,181,786 B1, or by other conventional means of conference control.

It is to be understood that the subsequent caller 40 to the conference call is generally located in the same LATA 50 as the subscriber. However, the subsequent caller 40 can call from any location, in any communication system, to the subscriber's phone number and be connected to the conference (in some cases, the subsequent caller 40 may pay long distance charges).

The above method steps and message contents represent only an embodiment of the present invention and, it is to be understood that method steps order and message contents can vary based upon individual telecommunication architects without departing from the spirit of the present invention.

(c) Ending of Conference Call

Figure 4:
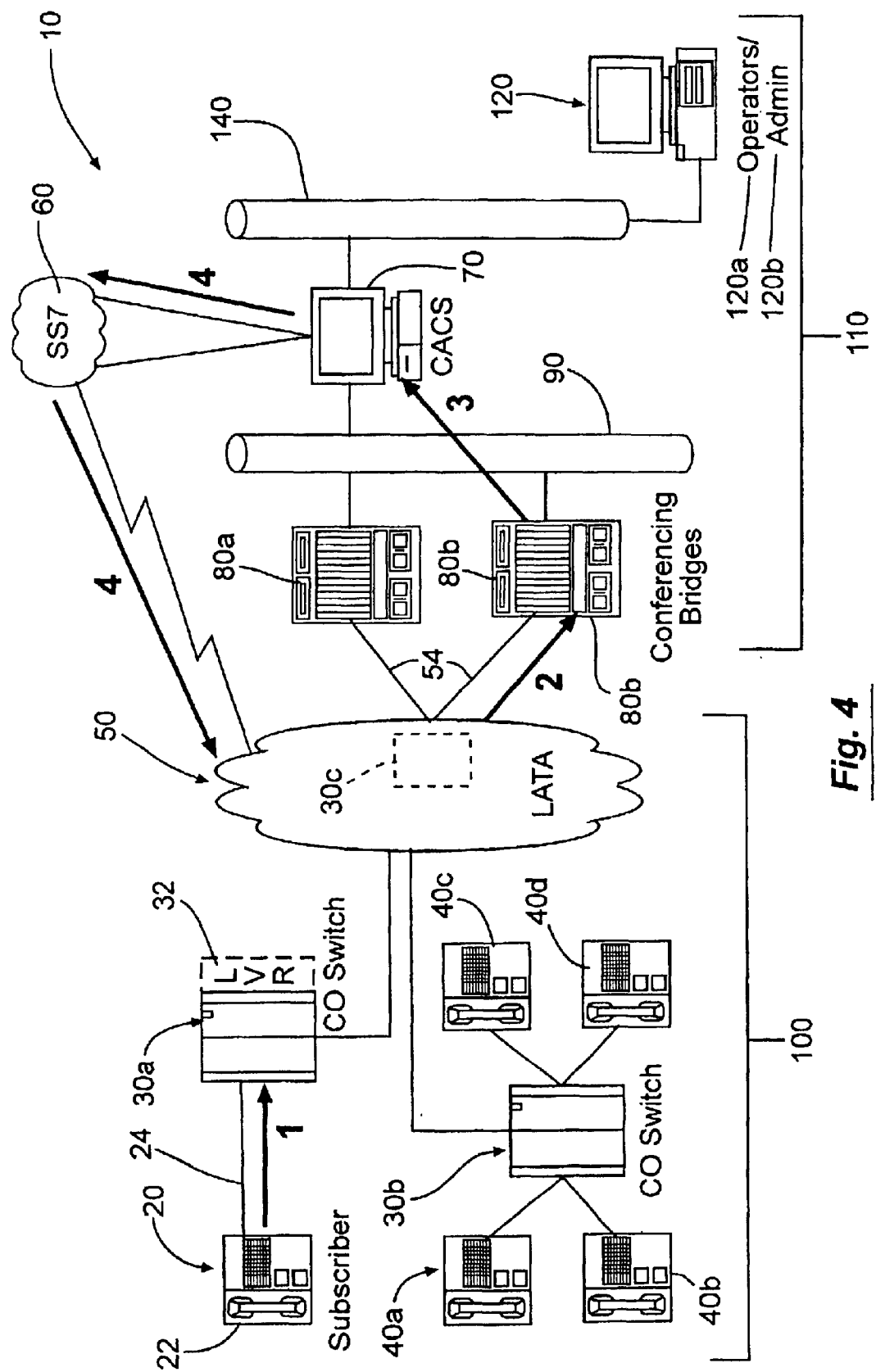
FIG. 4 is the network of FIG. 1 setting forth the method whereby the conference ends.

In FIG. 4, operation of the conferencing system 10 of the present invention whereby the conference ends and the subscriber line 24 is re-set to directly receive incoming telephone calls is set forth for the SS7 60 embodiment. The following numbers shown in FIG. 4 correspond to the method of accomplishing this:

1. The conference call ends when the subscriber line 24 issues an on hook signal.
2. Switch 30*a* detects conventionally that the subscriber line 24 has been disconnected and delivers a disconnect signal to the conferencing bridge 80*b*.
3. The bridge 80*b* informs the CACS 70 that the conference subscriber has disconnected. In one embodiment, any remaining parties (e.g., 40*a*–*d*) to the conference are disconnected at this point. Alternatively, the remaining parties 40*a*–*d* are allowed to remain connected to the conference until they disconnect.
4. The CACS 70 sends a TCAP message to switch 30*a* instructing it to return the subscriber line 24 to normal operation. This causes any subsequent calls to the subscriber line 24 phone number to terminate normally i.e., receive normal calls as the conference is over.

The above method steps and message contents represent only an embodiment of the present invention and, it is to be understood that method steps order and message contents can vary based upon individual telecommunication architects without departing from the spirit of the present invention.

3. Methods

Figure 5:
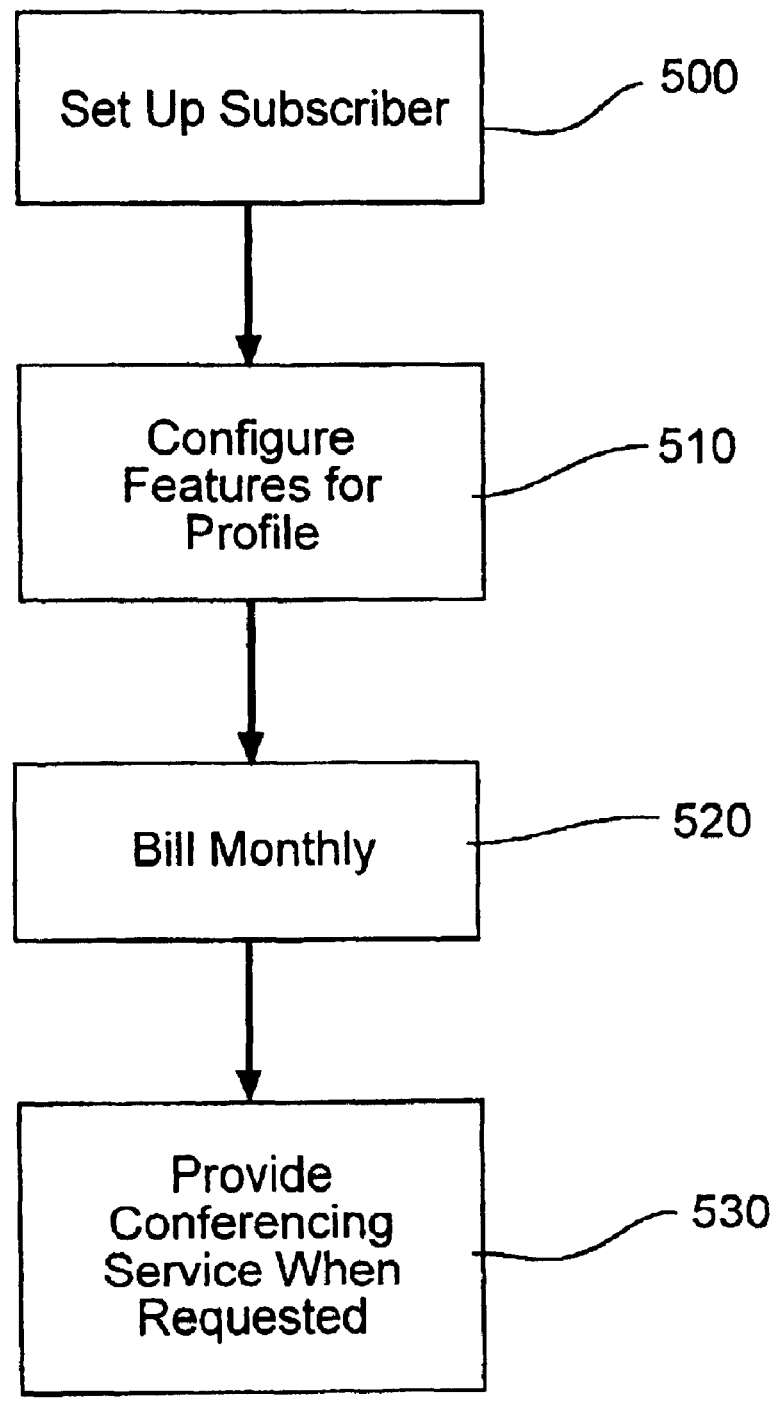
FIG. 5 is a flow chart illustrating the method of the present invention for setting up the profile of a subscriber to use the conferencing service.

In FIG. 5, one method of set-up processing for a subscriber 20 is set forth under the present invention. This set-up process is used only once for any particular subscriber 20 to the conferencing service 10, prior to execution of the first conference call for that particular subscriber. In step 500, a subscriber 20 contacts the local exchange carrier 100 and subscribes to the conferencing service 10 of the present invention. In stage 510, the subscriber 20 selects the features for his/her profile to be used in conference calls. For example, a residential subscriber may have different features, as previously discussed, than a business subscriber. In stage 520, the new subscriber 20 is also set up on a billing system which, in one embodiment, is a monthly billing. In this embodiment it is a flat rate such as what a subscriber 20 conventionally pays for conventional call forwarding, etc. Other billing models could include metered (per-minute) usage charges, package bundling with other services, etc. At this point, the subscriber 20 is set up to place in stage 530 a conferencing call when requested.

It is to be expressly understood that the above steps 500 through 530, as shown in FIG. 5, are in order of performance for one embodiment of the present invention. The precise ordering of the steps is immaterial and can vary based upon the operating requirements of LEC 100. In addition, how these steps are performed can occur in a number of conventional ways. For example, the subscriber 20 in stages 500 and 510 can perform this over the phone orally, on an Internet web page by filling out a form, etc.

Figure 6:
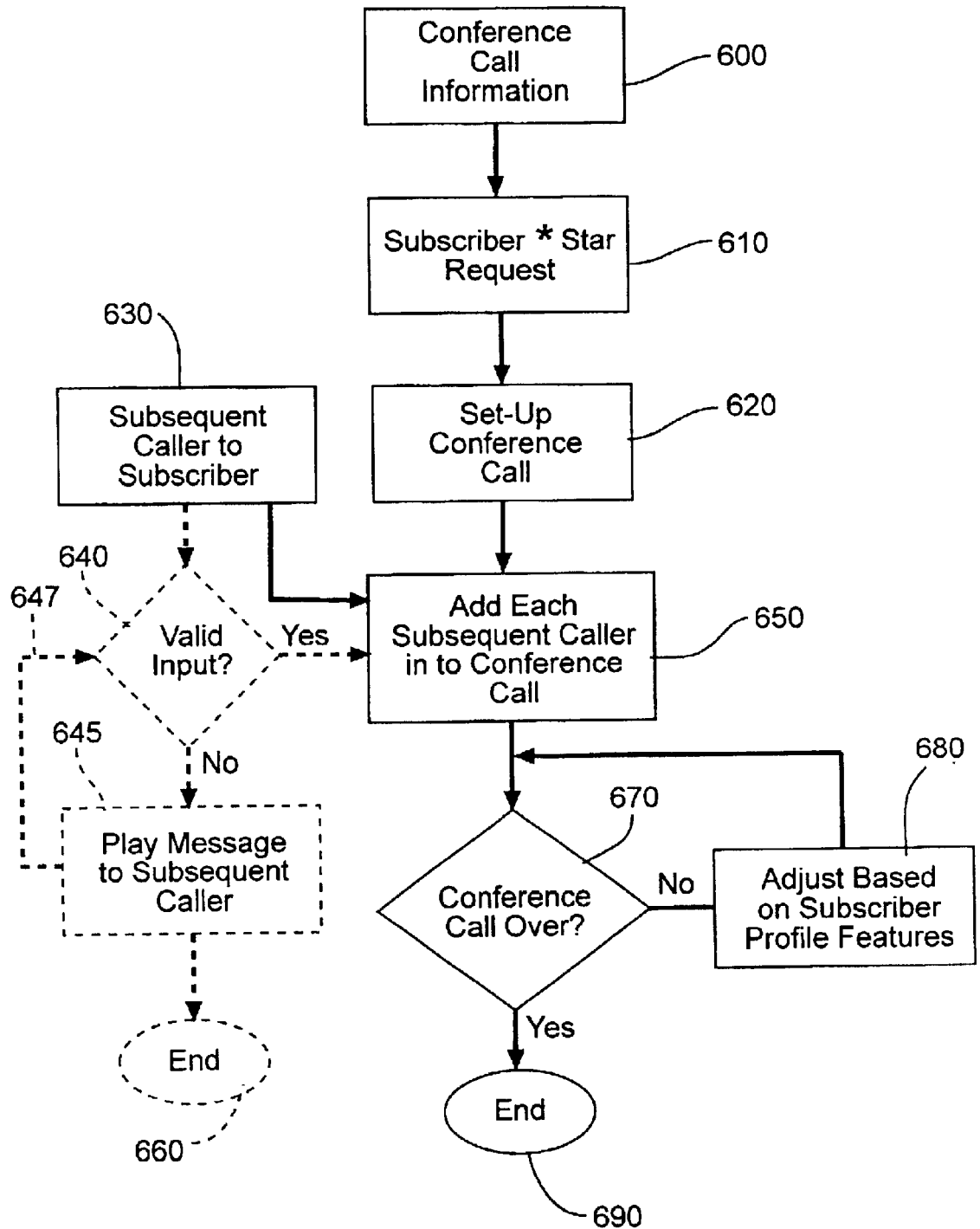
FIG. 6 is a flow chart illustrating the method of the present invention for a subscriber setting up a conference call and for subsequent callers to join the conference call.

In FIG. 6, the setting up and participating in a conference call of the present invention is set forth. In step 600, the subscriber 20 contacts the other participants 40 in the conference call. For example, the subscriber 20 may call, e-mail, fax, use the Internet, etc. all other desired participants 40 in the conference call and inform them of a time for the call and to call his/her phone number for his/her phone 22 at that time. The performance of step 600 can be at any suitable time in advance of conference calls of the present invention.

In step 610, the subscriber 20 using phone 22 dials a predetermined series of inputs such as "*90" to initiate the conference. In stage 620, the LEC 100 and the conferencing system 110, as fully described above for FIG. 2, sets up the conference call for the subscriber 20.

At this time, the subscriber 20 is on line and has a conference call set up ready for other participants (i.e., subsequent callers 40 to the subscriber's phone number) based upon the subscriber's profile (step 510 in FIG. 5). At, about, or just after the time of the conference call, one or more additional participants 40 in stage 630 calls the subscriber's phone number for phone 22. LEC 100 and conferencing system 110 forwards each subsequent caller 40 to the selected bridge 80 (e.g., 80b).

Optionally, as shown by dotted lines in stage 640, the subsequent caller 40 enters the additional signal (or signals) CED such as pressing the number "1." When valid, stage 650 is entered and the subsequent caller 40 is added as a participant to the conference call. If not valid, a message is played in stage 645 to the subsequent caller 40. The subsequent caller 40 may be given one or more retries 647 and, if the subsequent caller does not enter the proper signal in stage 640, the process ends 660 with respect to that subsequent caller.

The same steps 640, 645, and 660 are optionally used by the CASC 70 to verify the input of the Conference Security Code (CSC) by the subsequent caller discussed earlier.

In stage 650, subsequent callers 40 are added to the conference call. The aforesaid steps are shown in FIG. 3.

The conferencing system 110 monitors in step 670 whether the conference call is over and, if not, in stage 680 continues to monitor and adjust the conference call based upon the subscriber 20 profile features as keyed in by the subscriber 20. Any operator 120a, administrator 120b, profile (including conference control) features can be performed during the conference call. Once the conference call is over, stage 690 is entered. The conference ends, in one embodiment, when the subscriber 20 disconnects. In another embodiment, a timer times out. Any remaining participants 40 would be played a voice message and disconnected from the conferencing bridge. Upon disconnection, the switch immediately resets the subscriber line to "normal" mode (e.g., deactivating the subscriber's termination attempt trigger) allowing the subscriber to be able to receive normal point-to-point calls. The aforesaid steps are shown in FIG. 4.

4. Alternate Operational Embodiments a. Pre-set "Conference Mode"

With this option, the subscriber 20 enters the *90 DTMF sequence (or any other sequence) into his/her phone 22 at dial tone and then is played a message (such as a switch-based IVR 32 resource) that his/her phone service is now in "conference mode". The subscriber 20 then hangs up or presses 1 to join the conference. While in "conference mode," all subsequent callers 40 to the subscriber's phone number would be played a message which informs them that the person they have called is in a conference call. Subsequent callers 40 who press 1 would be routed to a conference bridge and placed into the conference call.

The conference would end in stage 690 under either one of the following conditions: 1) the subscriber 20 joins the conference and then disconnects, or 2) the subscriber 20 enters *90 at dial tone again (or any suitable conference end signal or sequence input by the subscriber). In either case, conference participants would be played a voice message and disconnected.

b. Regular Phone Call Becomes Conference

Under this embodiment, the subscriber keys in *90 (or any other sequence or suitable signal) during a regular POTS phone call, which results in both parties to the call setting up a conference call and being transferred to a conference bridge 80. Subsequent callers 40 to the subscriber's phone number are directed to the conference after a confirmation IVR message. The signaling is a matter of design choice and does not limit the scope of the invention.

c. Pre-set Conference Mode, Ring Back on First Participant

This embodiment is similar to a. above, except that the subscriber 20 would be called, if he/she is not already in conference, when the first participant 40 is sent to the conference. The subscriber 20 is prompted with an appropriate message and given the opportunity to join the conference.

d. Attended Entry with Participant Recorded Name

As an extension to the capability described in a. above, conference participants 40 are prompted, once they are connected to the conference bridge, to record their name for conference entry screening. The subscriber 20 is played a message informing him/her that a subsequent caller 40 is requesting to join their conference, with the subsequent caller identified by the recorded name. The subscriber 20 is given the opportunity to input a signal that either authorize that person in or to disconnect. Optionally, the subscriber 20 is allowed to speak privately (outside the conference) with the caller 40 prior to placing him/her in conference or disconnecting him/her.

e. Attended Entry Using Existing LEC Call-Waiting Mechanism

This embodiment is similar to that proposed in d. above, except that participant 40 entry is attended through the existing LEC call-waiting mechanism. The subscriber 20 is informed of new incoming callers 40 with voice path call-waiting tones. The subscriber 20 then performs a hook flash to speak with the incoming caller 40. In the switch 30, a second hook flash would place the caller 40 in conference.

f. Subscription Management in Network 100 Instead of CACS 70

This embodiment involves an assumption in the CACS 70 that all subscriber 20 calls that reach the conferencing system 110 represent calls from valid subscribers 20. In this embodiment, the CACS 70 need not have a pre-existing account profile established for the subscriber; rather the CACS 70 will use a predetermined profile of conference configuration settings that will apply to all conferences on the system 110.

5. Alternate Architectural Embodiments.

Several architectural alternatives exist under the teachings of the present invention:

a. Bridges 80 Located with Individual LEC Switches 30

Figure 7:
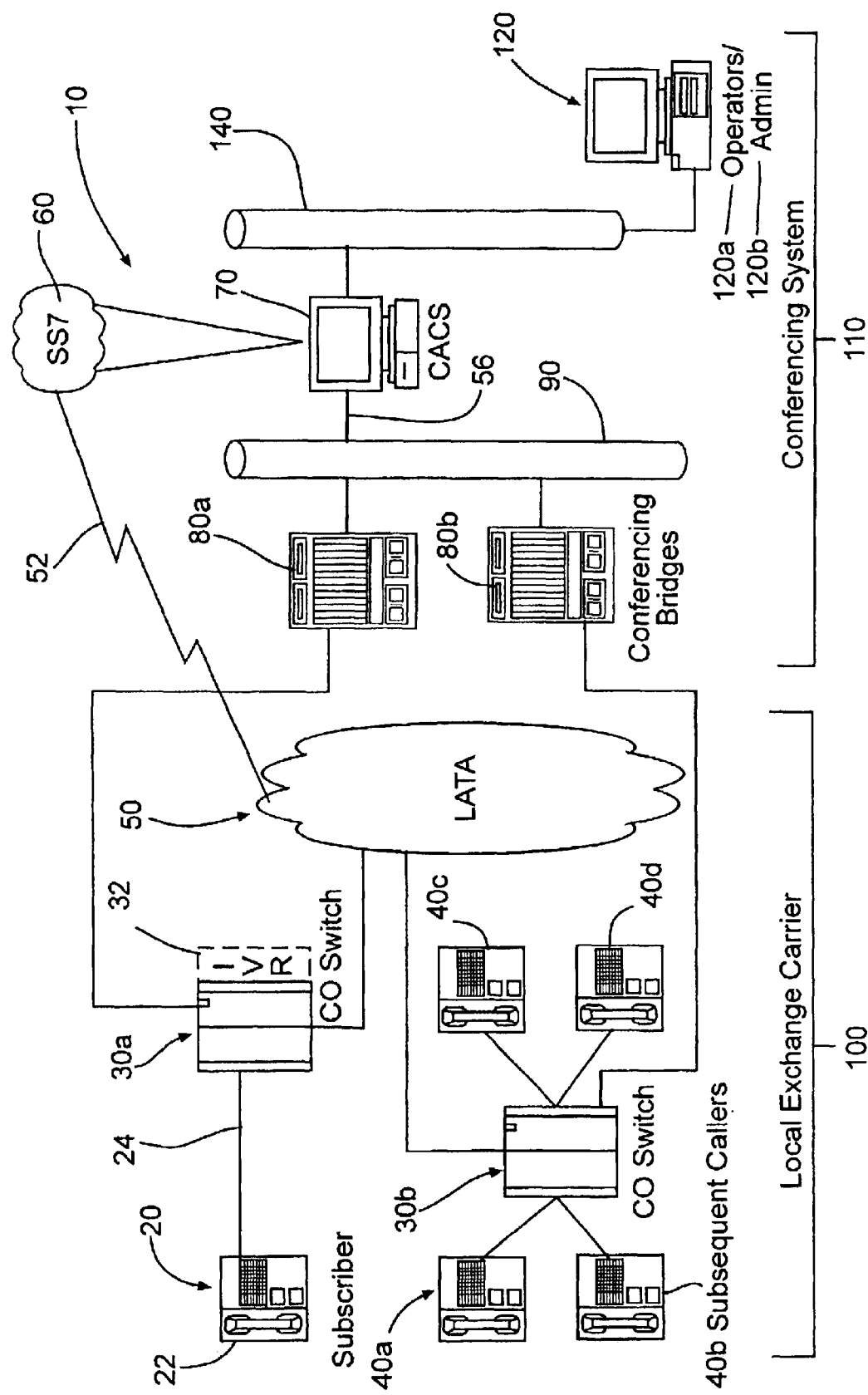
FIG. 7 is another embodiment of the conferencing service of the present invention with the telecommunication network having a bridge located behind each LEC switch.

This configuration shown in FIG. 7 distributes conference trunking capacity to individual switches 30 in the LEC network 100. All conferences would be handled by the bridge 80 or bridges (and servers 70 and 90) located physically behind the switch 30a that services the subscriber's phone line 20a.

b. Bridges 80 Centrally Located Within the LEC Network 100

Figure 8:
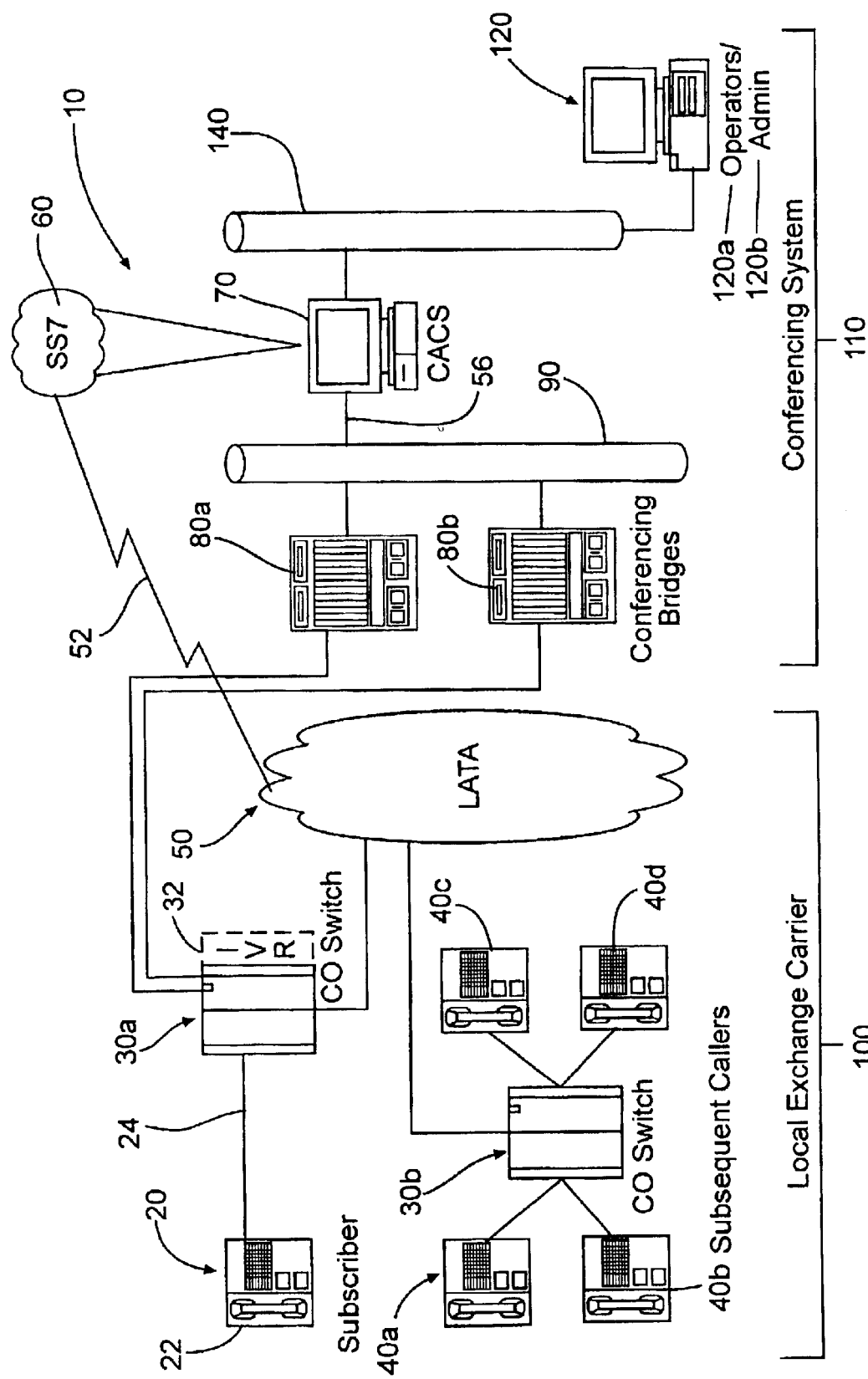
FIG. 8 is another embodiment of the conferencing service of the present invention with the telecommunication network having all the bridges behind a switch.

This configuration shown in FIG. 8 places all of the conference bridges 80 behind a single switch 30 in the LEC network 100, which concentrates the trunking capacity to a particular switch 30 and switch site. This configuration would allow for more efficient capacity management and bridge port resource management, because all of the bridges are controlled by one central conferencing call router.

c. Fixed Access (Without SS7 Network 60)

Figure 9:
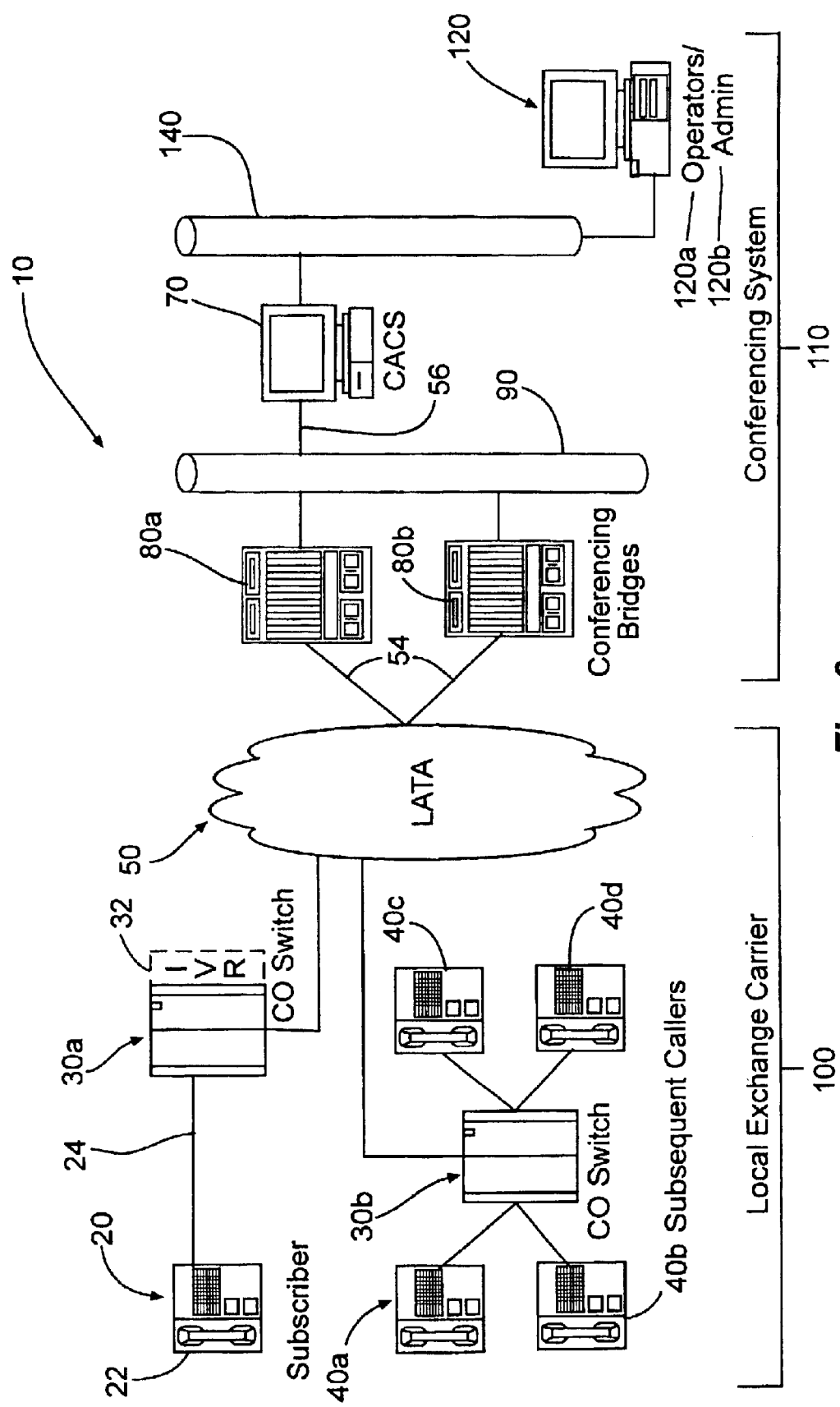
FIG. 9 is another embodiment of the conferencing service of the present invention with the telecommunication network without using the SS7 network.

This configuration shown in FIG. 9 removes the conferencing system 10 connections to the SS7 network 60. In this embodiment, conference calls involving a particular subscriber 20 will always terminate on the same conference bridge 80. Control of subscriber line 24 behavior necessary to direct incoming callers to the conference when appropriate takes place either within the switch 30 or otherwise within the telephone network 100.

It is to be understood that the teachings of the present invention can be implemented in a number of telecommunication architectures, not limited to the above.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

We claim:

1. A conferencing method for a conference call in a telecommunications system comprising:
   receiving, in a local exchange carrier, a series of input signals from the phone of a subscriber when the subscriber requests the conference call,
   connecting the phone of the subscriber to the conference call in a bridge,
   routing each subsequent caller of the phone number of the subscriber when received in the local exchange carrier to the bridge,
   connecting each subsequent caller to the conference call in the bridge in response to routing, and
   returning the subscriber phone to normal service when the conference call ends.

2. The conferencing method of claim 1 wherein the series of input signals is a dual-tone multifrequency (DTMF) sequence of key inputs starting with a "*" (star) key input.

3. The conferencing method of claim 1 wherein the series of input signals is in response to dial tone.

4. The conferencing method of claim 1 wherein the series of input signals is made during an existing phone call by the subscriber.

5. The conferencing method of claim 1 wherein the series of input signals are received in a central office switch of the local exchange carrier serving the subscriber.

6. The conferencing method of claim 1 wherein connecting the phone of the subscriber occurs after the first subsequent caller is connected to the conference call.

7. The conferencing method of claim 1 wherein the bridge is located in a conferencing system.

8. The conferencing method of claim 1 wherein connecting the phone of the subscriber to the bridge comprises setting up the conference call in a conferencing system with communications through the telecommunications system and the local exchange carrier of the subscriber.

9. The conferencing method of claim 1 wherein the communications are dynamically routed through Signaling System No. 7 of the telecommunications system.

10. The conferencing method of claim 1 wherein the bridge is located with a switch in the local exchange carrier.

11. The conferencing method of claim 10 wherein the switch in the local exchange carrier is the switch serving the subscriber.

12. The conferencing method of claim 1 wherein connecting the phone of the subscriber to the conference call comprises setting a dialed number trigger at the switch of the subscriber in the local exchange carrier.

13. The conferencing method of claim 12 further comprising sending to a conferencing system at least the subscriber's phone number.

14. The method of claim 13 further comprising:
   validating the subscriber based upon the sent phone number in the conferencing system, and
   setting up the conference call in response to validating based on the subscriber's conference profile.

15. The conferencing method of claim 1 wherein routing comprises:
   determining at the subscriber's switch in the local exchange carrier that the subscriber is in the conference call in response to each subsequent caller calling the subscriber,
   playing an announcement to each subsequent caller in response to determining, the announcement requesting each said subscriber to input a code having at least a dual-tone multifrequency (DTMF) signal,
   sending the code from the subscriber's switch to a conferencing system for validation, and
   delivering the identity of the bridge of the conference call from the conferencing system to the switch of the subscriber.

16. The conferencing method of claim 15 wherein returning comprises:
   delivering a call disconnect signal from the subscriber's switch to the bridge in the conferencing system when the subscriber's phone issues an on hook signal,
   disconnecting the subsequent callers from the conference call in response to the delivered call disconnect signal, and
   setting a dialed number trigger at the switch of the subscribers in the local exchange carrier returning the subscriber's phone to normal operation.

17. The conferencing method of claim 1 wherein connecting each subsequent caller to the conference call comprises:
   informing the subscriber that the subsequent caller is requesting to join the conference call, and
   receiving a signal from the subscriber authorizing the subsequent caller to join.

18. The conferencing method of claim 17 further comprising allowing the subscriber to privately speak (outside the conference call) with the subsequent caller.

19. The conferencing method of claim 18 wherein informing occurs with voice path call-waiting tones, a first hook flash from the subscriber allows the subscriber to speak with the subsequent caller, and a second flash hook from the subscriber authorizes the subsequent caller to join.

20. The conferencing method of claim 1 further comprising setting up a profile for the subscriber so as to enable conference call requests from the subscriber.

21. The conferencing method of claim 20 wherein the profile contains at least one conference control feature.

22. The conferencing method of claim 21 wherein the conference control feature is an input from the subscriber that resets a timer in order to continue the conference.

23. The conferencing method of claim 21 wherein the conference control feature is an input from the subscriber removing an undesired participant from the conference.

24. The conferencing method of claim 21 wherein the conference control feature is an input from the subsequent caller in response to a conference security code request from the bridge, when the aforesaid input is correct, the subsequent caller is connected to the conference.

25. The conferencing method of claim 21 wherein the conference control feature is a mute input from the subscriber and/or subsequent caller to mute undesired noise into the conference.

26. The conferencing method of claim 21 wherein the conference control feature is a conference count input from the subscriber that results in a voice message count of the number of conference participants.

27. The conferencing method of claim 21 wherein the conference control feature is a subscriber dial out input from the subscriber that allows the subscriber to access a dial out line from the bridge so as to call a party to add to the conference.

28. The conferencing method of claim 1 further comprising providing a predetermined profile for the subscriber in response to said receiving.

29. A conferencing method for a conference call in a telecommunications system comprising:
   receiving, in a central office switch of a local exchange carrier serving the subscriber, a dual-tone multifrequency (DTMF) sequence of key input signals starting with a "*" (star) key input from the phone of a subscriber when the subscriber requests the conference call,
   connecting the phone of the subscriber to the conference call in a bridge,
   routing each subsequent caller of the phone number of the subscriber to the bridge,
   connecting each subsequent caller to the conference call in the bridge in response to routing, and
   returning the subscriber phone to normal service when the conference call ends.

30. The conferencing method of claim 29 wherein connecting comprises setting a dialed number trigger at the switch of the subscriber in the local exchange carrier.

31. The conferencing method of claim 29 further comprising sending to the conferencing system at least the subscriber's phone number.

32. The conferencing method of claim 31 further comprising:
   validating the subscriber based upon the sent phone number in the conferencing system,
   setting up the conference call in response to validating based on the subscriber's conference profile.

33. The conferencing method of claim 29 wherein routing comprises:
   determining at the subscriber's switch in the local exchange carrier that the subscriber is in the conference call in response to each subsequent caller calling the subscriber,
   playing an announcement to each subsequent caller in response to determining, the announcement requesting said each subscriber to input a code having at least a DTMF signal,
   sending the code from the subscriber's switch to the conferencing system for validation, and
   delivering the identity of the bridge of the conference call from the conferencing system to the switch of the subscriber.

34. The method of claim 29 wherein returning comprises:
   delivering an end of conference call signal from the subscriber's switch to the bridge in the conferencing system when the subscriber's phone issues an on hook signal,
   disconnecting the subsequent callers from the conference call in response to the delivered end of conference signal, and
   setting a dialed number trigger at the switch of the subscribers in the local exchange carrier returning the subscriber's phone to normal operation.

35. The conferencing method of claim 29 further comprising:
   assigning a forwarding number to the phone number for the phone of the subscriber, the assigned forwarding number located in a local exchange carrier of the subscriber, the assigned forwarding number identifying the bridge.

36. The conferencing method of claim 35 further comprising:
   forwarding the subscriber to the assigned forwarding number, and
   setting the phone number of the subscriber in the local exchange carrier to forward all subsequent callers to the assigned forwarding number.

37. The conferencing method of claim 36 wherein the step of routing includes forwarding each subsequent caller to the assigned forwarding number.

38. The conferencing method of claim 29 wherein the conference call ends when the subscriber's phone goes on hook.

39. The conferencing method of claim 29 wherein the conference call ends when the subscriber inputs a conference end signal.

40. A method of providing conferencing call service in a local exchange carrier comprising:
   allocating at least one bridge in a conferencing system to the local exchange carrier,
   inputting signals from a telephone of a subscriber requesting the conferencing call service, and
   setting up a conference call in the at least one bridge in the conferencing system based on forwarding subsequent calls to the telephone number of the subscriber to the conference call.

41. The conferencing method of claim 40 wherein the subscriber pays the local exchange carrier for the conferencing service.

42. The conferencing method of claim 40 further comprising:
   receiving from the subscriber additional control signals during inputting signals to provide control features in the conference call for use by the subscriber.

* * * * *